(12) United States Patent
Farmer

(10) Patent No.: US 8,961,786 B1
(45) Date of Patent: Feb. 24, 2015

(54) EASY RELEASE FOOD CONTAINER

(76) Inventor: Lesia Marie Farmer, Athens, TX (US)

( * ) Notice: Subject to any disclaimer, the term of this patent is extended or adjusted under 35 U.S.C. 154(b) by 439 days.

(21) Appl. No.: 13/025,478

(22) Filed: Feb. 11, 2011

Related U.S. Application Data

(60) Provisional application No. 61/420,383, filed on Dec. 7, 2010.

(51) Int. Cl.
*A47J 43/24* (2006.01)

(52) U.S. Cl.
USPC ........... 210/236; 210/238; 210/313; 210/348; 210/464; 210/469; 210/470; 210/473; D7/667; 209/258; 209/274; 99/495

(58) Field of Classification Search
None
See application file for complete search history.

(56) References Cited

U.S. PATENT DOCUMENTS

| | | | | | |
|---|---|---|---|---|---|
| 160,163 | A | * | 2/1875 | Colgrove | 292/241 |
| 1,621,823 | A | * | 3/1927 | Ayres | 99/540 |
| 2,747,739 | A | * | 5/1956 | Bissonnette et al. | 210/482 |
| 3,300,048 | A | * | 1/1967 | Pollock | 210/232 |
| 4,319,994 | A | * | 3/1982 | Morgan | 209/447 |
| 5,066,396 | A | * | 11/1991 | Rangel | 210/236 |
| 7,662,280 | B1 | * | 2/2010 | Cooney | 210/164 |
| 8,070,960 | B2 | * | 12/2011 | Conwell | 210/702 |
| 2014/0102961 | A1 | * | 4/2014 | Verveniotis | 210/91 |
| 2014/0251890 | A1 | * | 9/2014 | Miller et al. | 210/238 |

OTHER PUBLICATIONS

Colander—Wikipedia—downloaded Sep. 26, 2014; 2 pages.*

* cited by examiner

*Primary Examiner* — Robert James Popovics
(74) *Attorney, Agent, or Firm* — Michael D. Eisenberg

(57) ABSTRACT

A food container, comprising: a curved bottom; an opening in the bottom; a track connected to the bottom and adjacent the opening; a door slideable within the track, configured to encompass and occlude the opening in the bottom. When the door is opened, contents contained in the food container are pulled through the opening under the influence of gravity, and out of the food container without the need to rotate the container.

14 Claims, 13 Drawing Sheets

*Fig. 11* *Fig. 12*
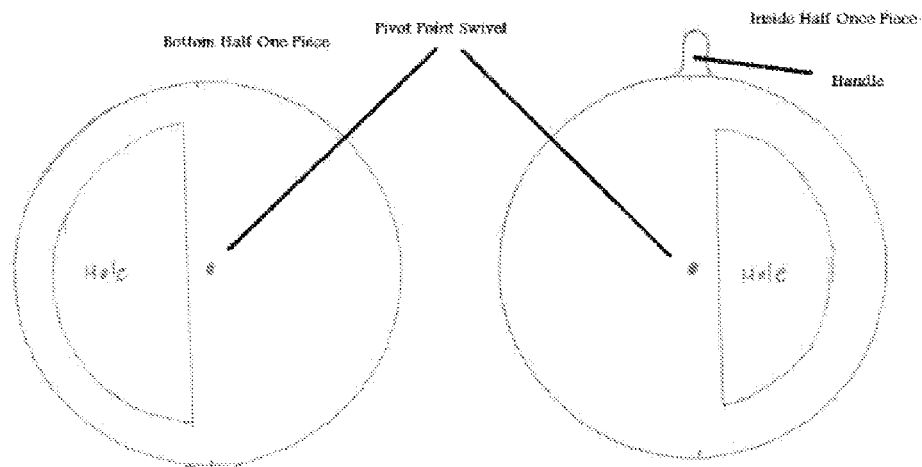
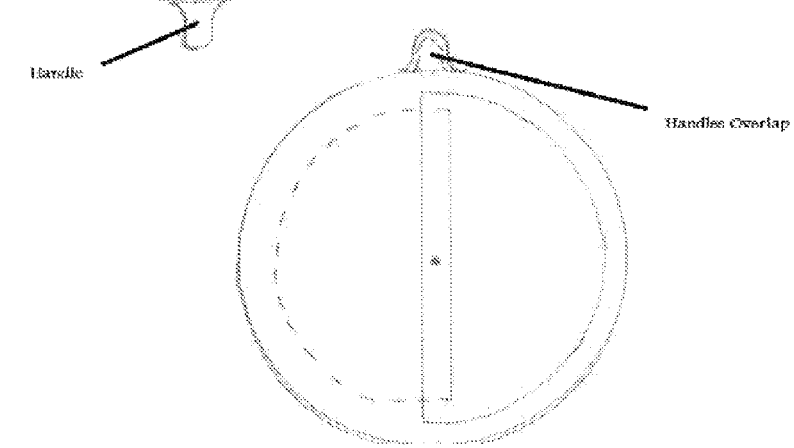
*Fig. 13*

EASY RELEASE FOOD CONTAINER

CROSS-REFERENCES TO RELATED APPLICATIONS

The present application claims priority from U.S. Provisional Application Ser. No. 61/420,383 filed on Dec. 7, 2010 which is hereby incorporated herein by reference in its entirety.

TECHNICAL FIELD

The present invention, in some embodiments thereof, relates generally to food containers.

BACKGROUND OF THE INVENTION

The present invention relates generally to food containers such as colanders, bowls, measuring cups, strainers, vegetable steamers, or the like. Kitchen utensils such as colanders, bowls, measuring cups, strainers, vegetable steamers, or the like can be difficult to transfer the contents once contents are cooked, measured, or strained into another container. Upon transferring the contents from one container to another using the traditional method, there are the risk of steam burns, or spills, thus making them very difficult to use. Hence, it is inevitable that a person can spill the contents, or be burned by the steam, and while prior methods are somewhat effective those risk do exist. Accordingly, there is a need for an improved method of transferring contents from one container to another, once contents are cooked, measured, or strained.

BRIEF SUMMARY OF EMBODIMENTS OF THE INVENTION

An aspect of some embodiments to the present invention relates to a food container, comprising: a curved bottom; an opening in the bottom; a track connected to the bottom and adjacent the opening; and a door slideable within the track, configured to encompass and occlude the opening in the bottom. When the door is opened, contents contained in the food container are pulled through the opening under the influence of gravity, and out of the food container without the need to rotate the container.

In a variant of the food container, the track cross section comprises two members having flat sides in cross section for contacting the door and providing a surface for the door to slide against.

In another variant, the door is biased to completely occlude the opening.

In a further variant of the food container, two tracks are disposed on opposite sides of the opening.

In still another variant of the food container, the bottom is curved and the opening comprises two parallel sides formed by non intersecting curves along the bottom.

In yet a further variant of the food container, two doors are configured to slide in the tracks.

In another variant, the food container comprises: a handle member connected to the door; a second handle member connected to a curved side wall of the colander; and a biasing element connected between the first and second handle member, configured to bias the door away from the second handle member.

In a further variant, the food container comprises: two doors configured to slide apart to expose the opening; and a biasing element connected between the two doors and configured to bias the doors together to occlude the opening.

In still another variant, the food container comprises: a handle member connected to the door; a second handle member connected to a curved side wall of the colander; and a biasing element connected between the first and second handle member, configured to bias the door away from the second handle member.

In yet a further variant of the food container, the bottom is curved and the track's cross section comprises an L shaped subunit and an upper subunit conformed and shaped to be flush with the curved bottom.

In another variant a colander comprises: a bottom; an opening in the bottom; and a door configured to encompass and occlude the opening in the bottom. When the door is opened, contents contained in the colander are pulled through the opening under the influence of gravity, and out of the colander without the need to rotate the colander.

In a further variant of the colander, the bottom of the colander is curved and the door is curved having the same curvature as the colander bottom, and the colander further comprises first and second handles connected to the door and connected to a side of the colander.

In still another variant of the colander, the bottom of the colander is curved and the door is curved having the same curvature as the colander bottom, the colander further comprising two tracks disposed on either side of the opening, the door slideable within the track and track's cross section comprises a subunit shaped with a flat edge for receiving the door and an upper subunit connected to the curved bottom and having a curved side in cross section conforming to the curvature of the curved bottom.

In yet a further variant, a method of straining a food and liquid mixture, comprises: pouring the mixture into a colander stationed upright; pressing two handles of on the colander toward each other; opening a door in a bottom of the colander while the colander is stationed upright; releasing the strained mixture through an orifice in the bottom of the colander while the colander is stationed upright; and releasing the handles of the colander; closing the door in the bottom of the colander.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 11-13 illustrates a variant of the colander having an openable bottom.

Figure 1:
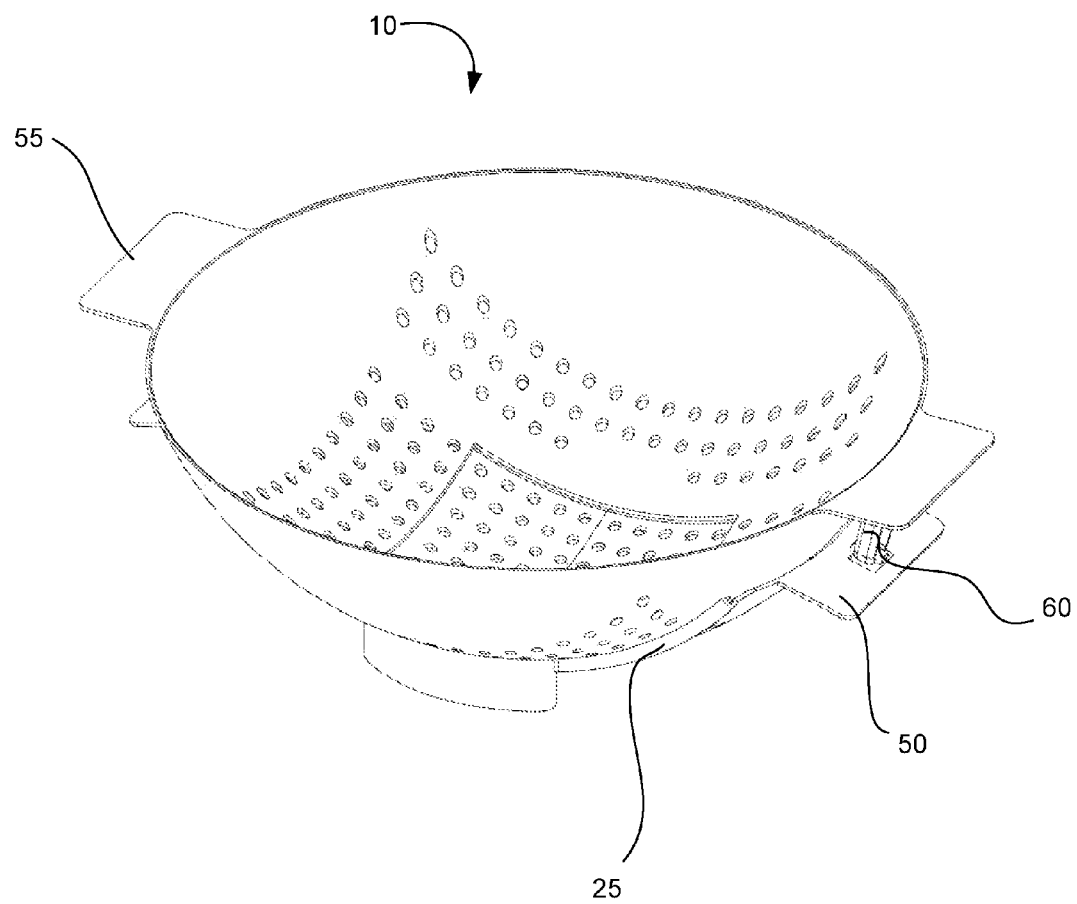
FIGS. 1-5 illustrate a colander having an openable bottom having a biasing element disposed between the handles.
Figure 2:
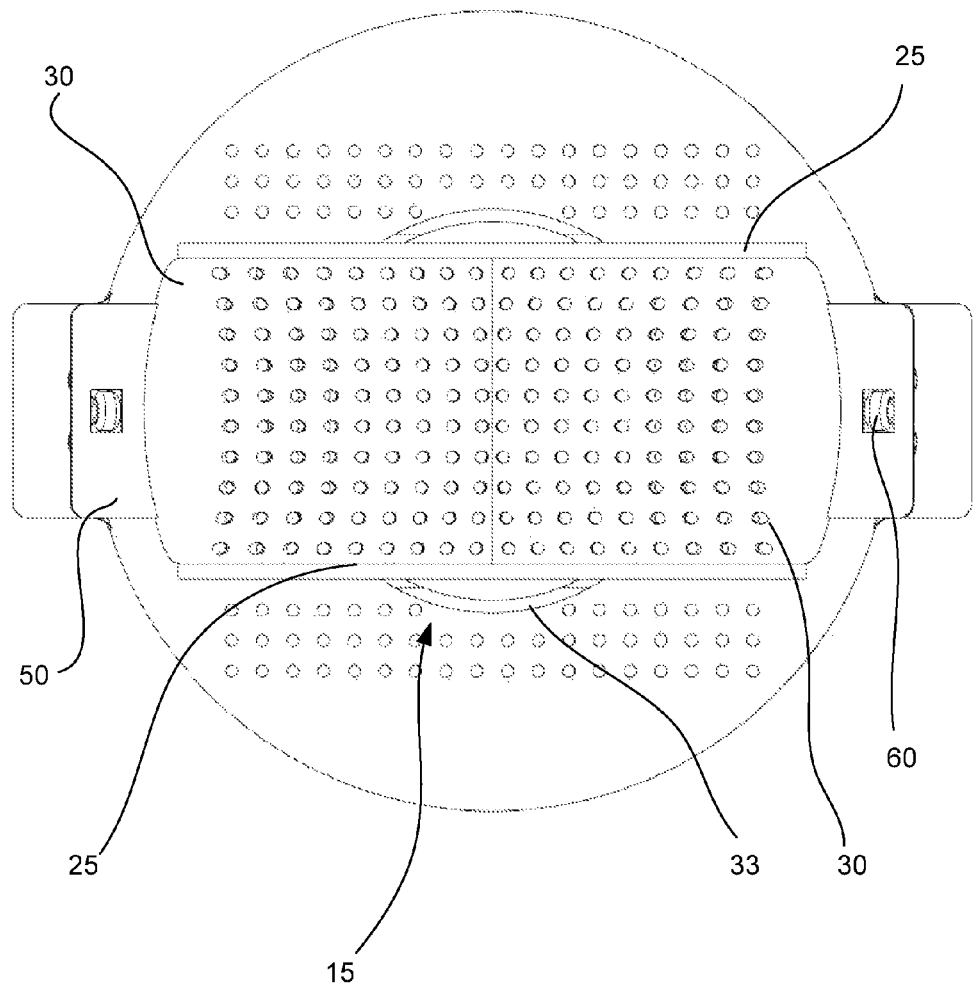
Figure 3:
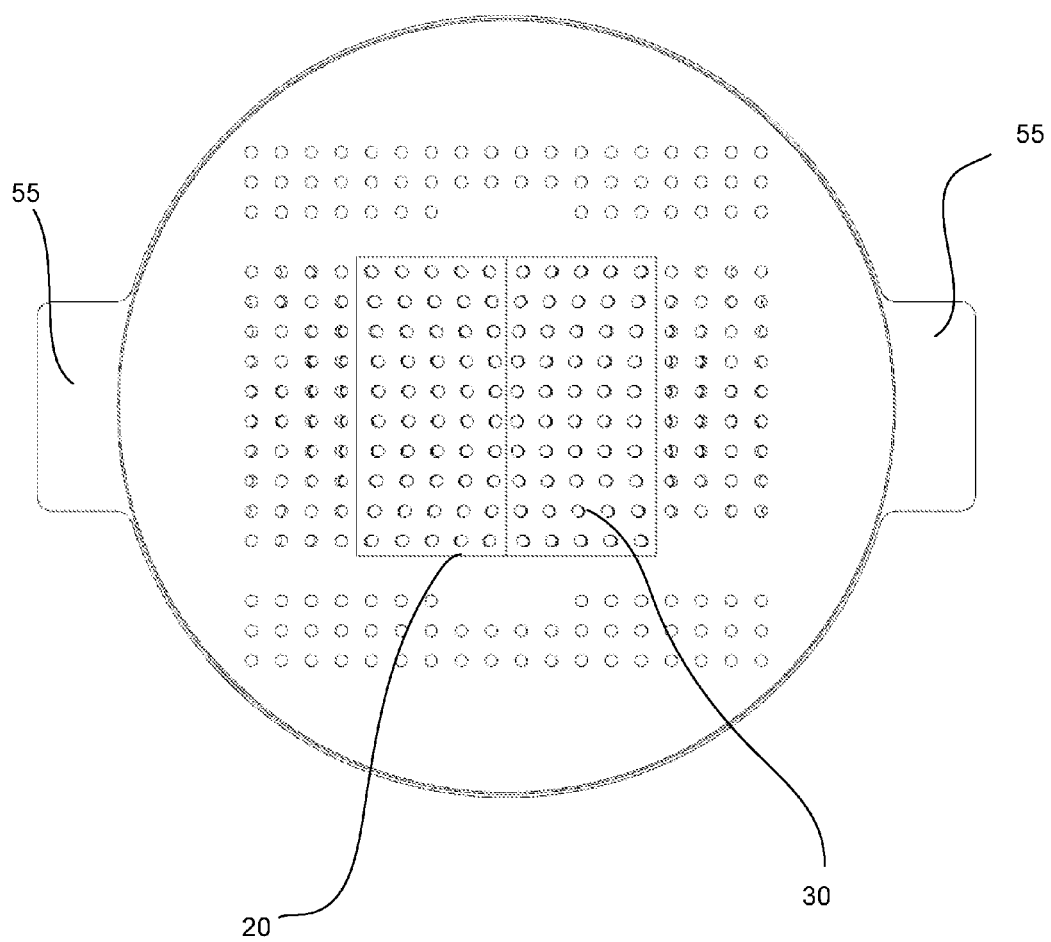
Figure 4:
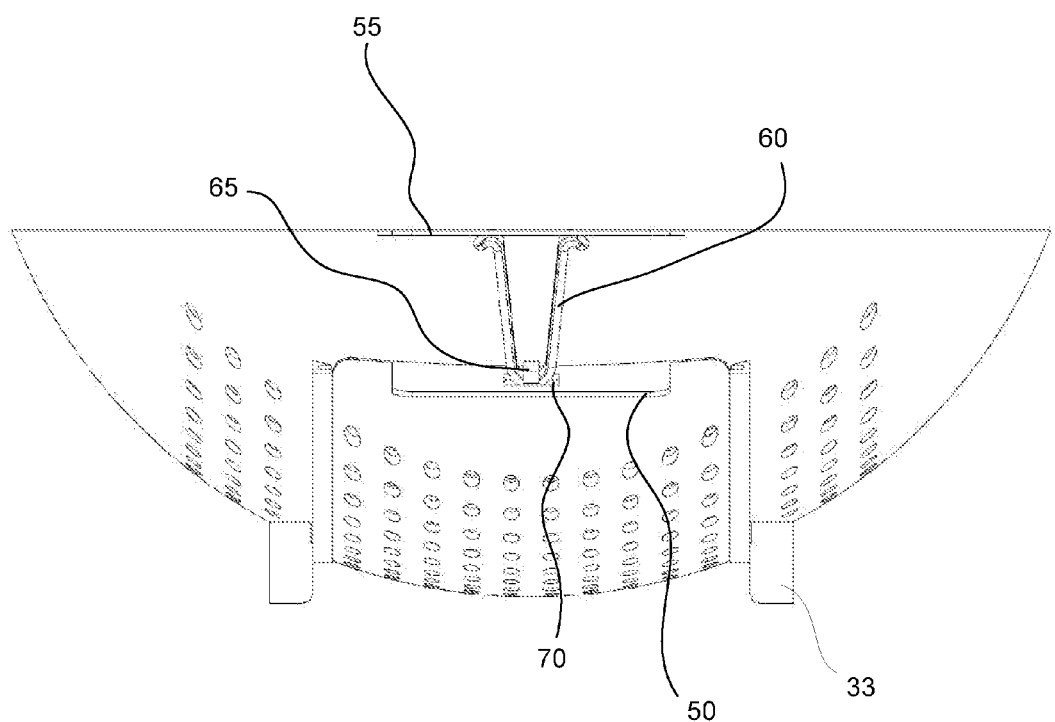
Figure 5:
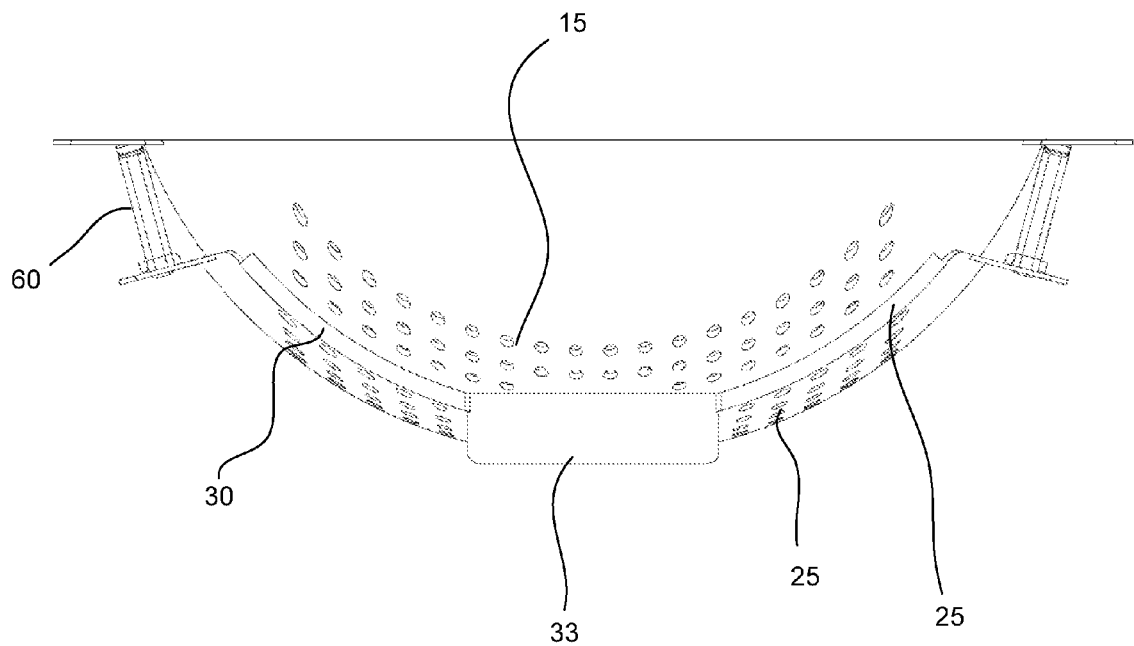
Figure 6:
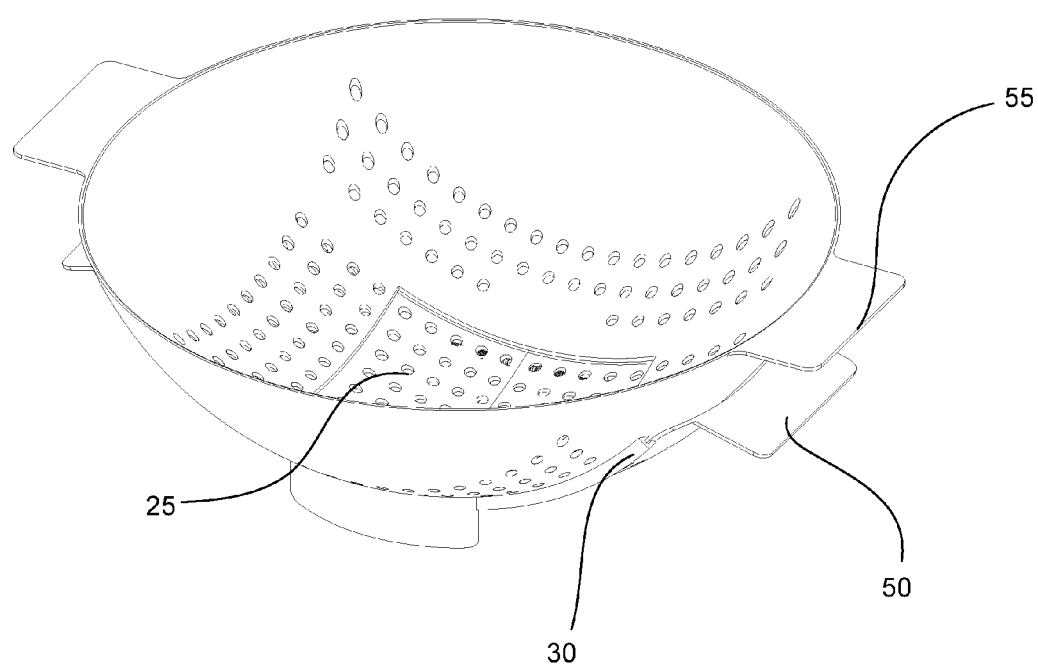
FIGS. 6-10 illustrate a colander having an openable bottom having a biasing element disposed between the doors.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention, in some embodiments thereof, relates to a food container 10 having an openable bottom for the easy removal of food contents. Referring to FIGS. 1-10, an aspect of some embodiments of the present invention relates to a colander 10. The colander 10 comprises a curved bottom 15 and an opening 20 in the bottom 15. A track 25 is connected to the bottom and adjacent the opening 20. A door 30 is slideable within the track 25 and configured to encompass and occlude the opening 20 in the bottom. When the door is opened, contents contained in the food container are pulled through the opening under the influence of gravity, and out of the food container without the need to rotate the container.

Figure 15:
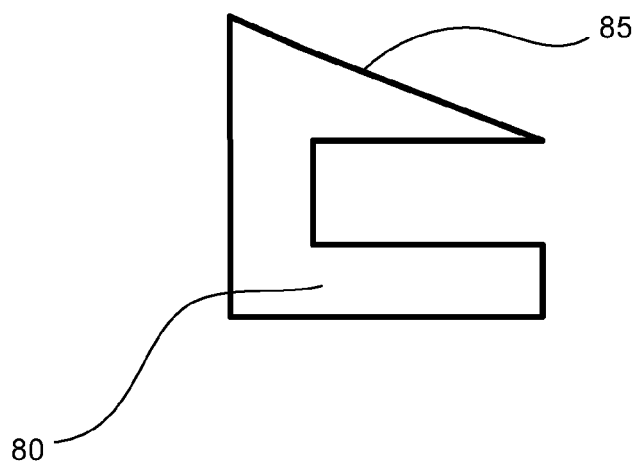
FIG. 15 illustrates a cross section of the track for receiving the door.
Figure 16:
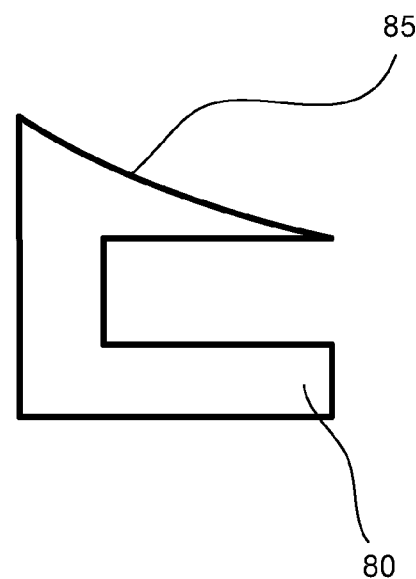
FIG. 16 illustrates a cross section of the track having a curved side for receiving the door.

In a variant, referring to FIGS. 15 and 16, the track cross section comprises two members 35, 40 having a flat sides in cross section for contacting the door and providing a surface for the door to slide against.

In another variant, the door is biased to completely occlude the opening. FIGS. 1-5 illustrate a variant wherein the biasing element is a U-shaped spring. FIGS. 6-10 illustrate a variant wherein the biasing element is a coiled spring connected between two door panels.

In a further variant, two tracks 25 are disposed on opposite sides 45 of the opening.

In still another variant, the bottom 15 is curved and the opening 20 comprises two parallel sides 45 formed by non intersecting curves along the bottom.

In yet a further variant, two doors 30 configured to slide in the tracks. Support legs 33 are disposed on either side of the opening and adjacent the tracks 25. The support legs may be shaped in a curved manner or in other visually pleasing ways.

In another variant, a handle member 50 is connected to the door and a second handle member 55 connected to a curved side wall of the colander 10. A biasing element, shown in FIG. 4, comprises a U-shaped spring 60 connected between the first and second handle member, configured to bias the door 30 away from the second handle member 55. The U-Shaped spring 60 connects to the first handle 50 by looping around and fastened to a nub 65 stationed over a hole 70 in the handle 50. When the first and second handles are 50, 55 pressed together, the spring will slide apart along the surface of the second handle 55.

Figure 7:
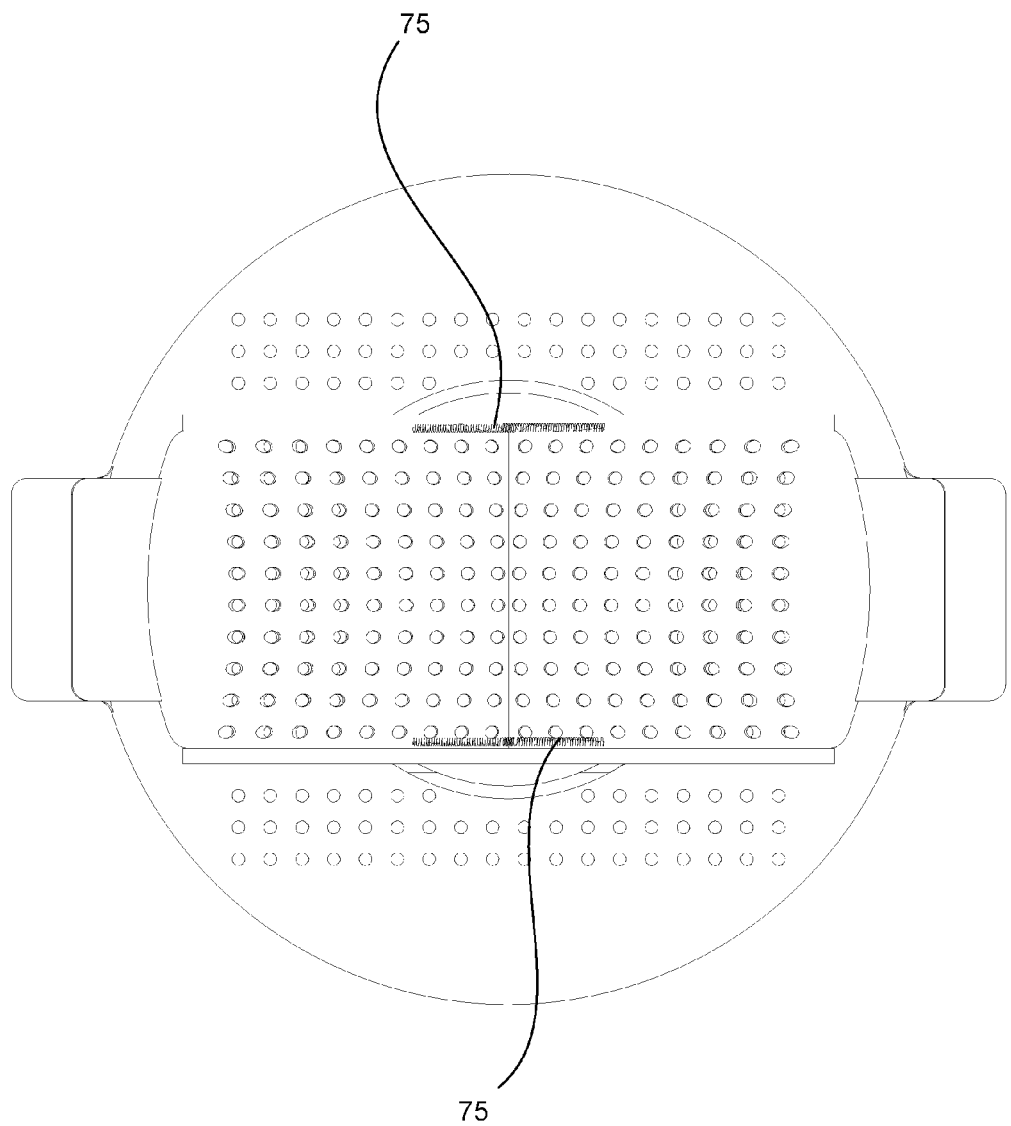
Figure 8:
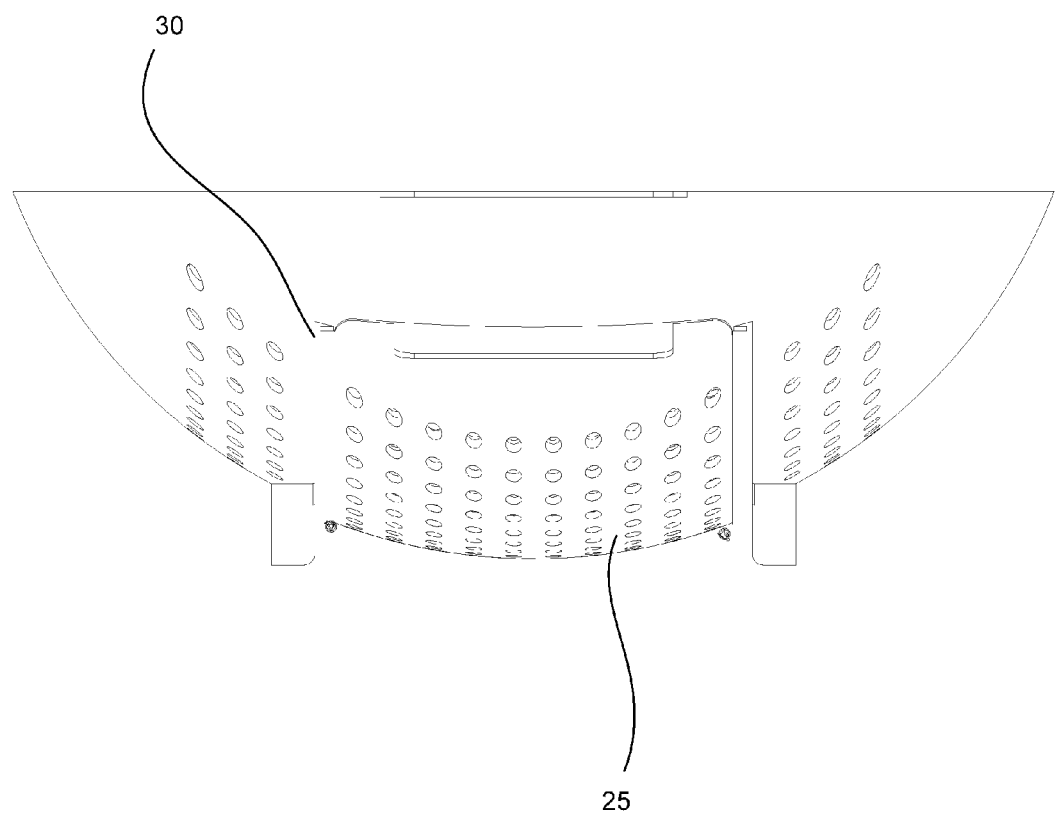
Figure 9:
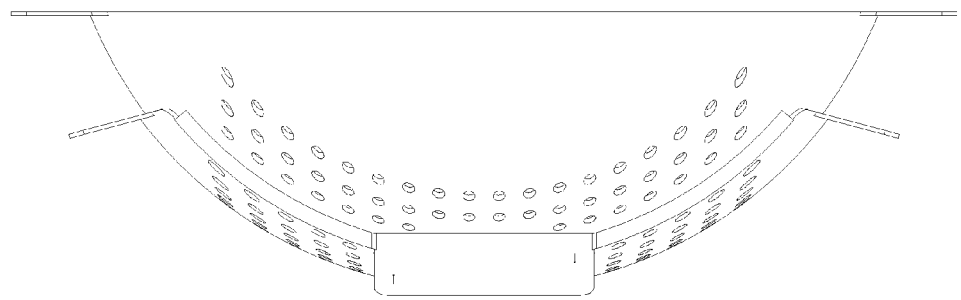
Figure 10:
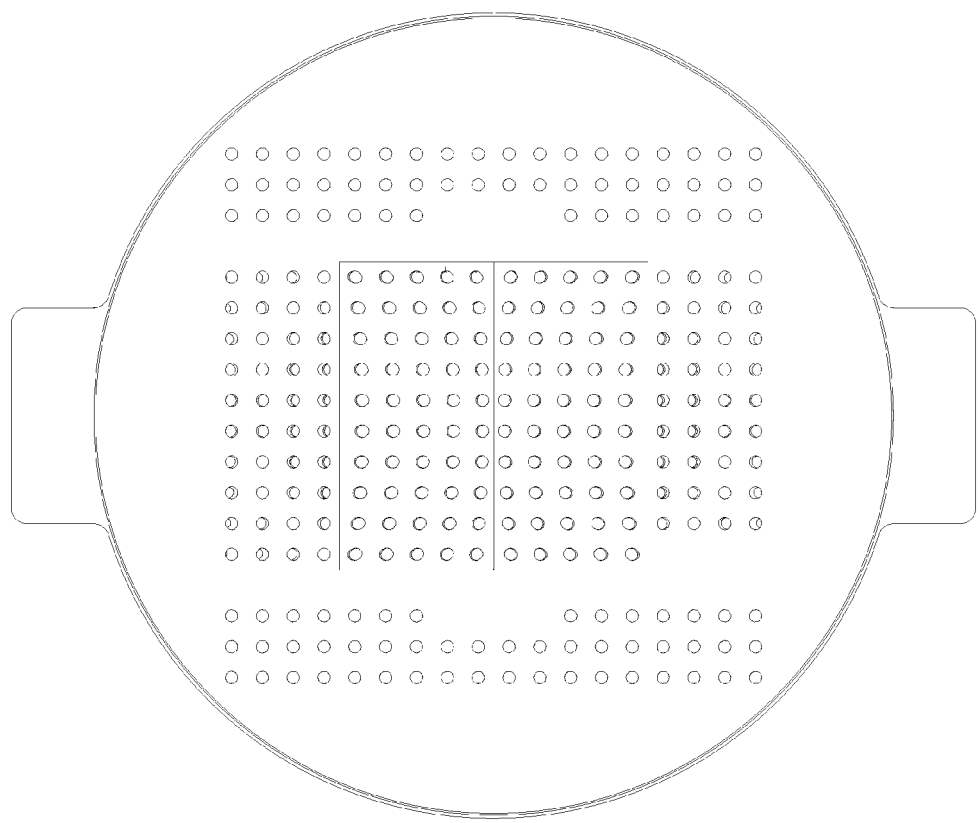

In a further variant, two doors 30 configured to slide apart to expose the opening 20 and a biasing element, which may for example as shown in FIG. 7, comprise a coiled spring 75 connected between the two doors and configured to bias the doors together to occlude the opening.

In still another variant, a handle member 50 is connected to the door a second handle member 55 connected to a curved side wall of the colander. A biasing element, which may comprise a U-shaped sprint, is connected between the first and second handle member, configured to bias the door away from the second handle member.

In another variant, the bottom of the colander is curved and, referring to FIG. 15, the track's cross section comprises an L shaped subunit 80 and an upper subunit 85, referring to FIG. 16, conformed and shaped to be flush with the curved bottom.

In a further variant, a colander has a bottom; an opening in the bottom; and a door configured to encompass and occlude the opening in the bottom. When the door is opened, contents contained in the colander are pulled through the opening under the influence of gravity, and out of the colander without the need to rotate the colander. The colander bottom is curved and the door is curved has the same curvature as the colander bottom. The colander has first and second handles connected to the door and connected to a side of the colander.

In still another variant, a method of straining a food and liquid mixture comprises pouring the mixture into a colander stationed upright; squeezing two handles of on the colander to together; opening a door in a bottom of the colander while stationed upright; releasing the strained mixture through an orifice in the bottom of the colander while stationed upright; releasing the handles of the colander; and closing the door in the bottom of the colander.

In a preferred embodiment, the colander can release contents through the lower portion of the colander. Contents can be released through an opening on the bottom, or side of the colander, without having to turn the colander over to remove contents, thus avoiding spills, and burns. This colander may have two tracks molded into the lower portion of the colander itself that will allow two sliding panels, doors, or the like to slide inside the tracks, and up each side of the colander, when handles are pulled in an upward motion, thus allowing an opening on the lower portion to release contents. Once handles are released, the sliding panels, drop back into place in a downward motion by a spring mechanism, thus closing up the opening.

Referring to FIGS. 11-13, another alternative embodiment of the invention comprises two sections at the bottom of colander bowl, both comprising a complete half, and each half having an opening. Thus once the bottom portion is turned in a clockwise, or counter clockwise motion, it would allow the openings in each half to be exposed for the contents to be released from the bottom of the colander bowl.

Figure 14:
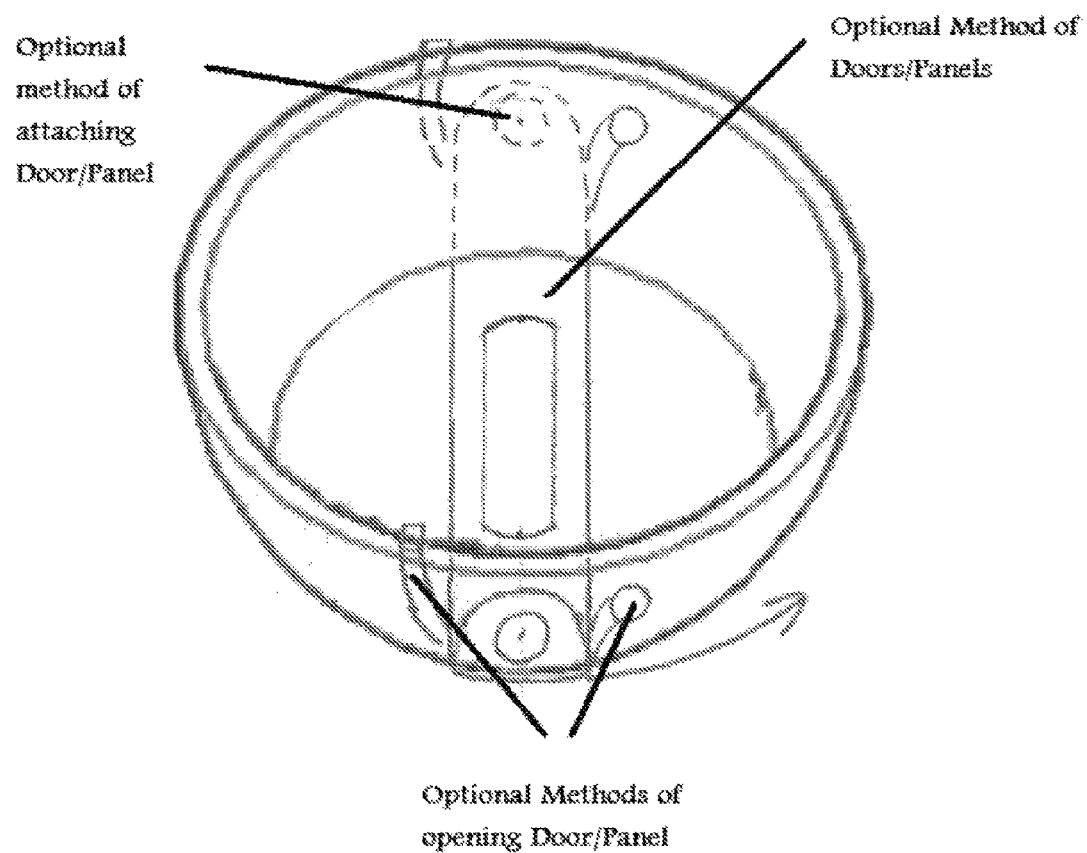
FIG. 14 illustrates a variant of the colander having an openable bottom.

Referring to FIG. 14, in an alternate embodiment of the invention the colander may be configured with only one door instead of two, and instead of a tracks or guides, the doors are held in place by two points on each side, allowing the one door/panel to swivel in a back and for the motion with a spring mechanism, and a stop point to allow the door/panel to open and close.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. In a colander for straining and/or holding food, said colander including a container with a curved sidewall having a plurality of orifices therethrough, and having a curved bottom, the improvement comprising:
    an opening in the curved bottom;
    a pair of curved tracks conformed and shaped to be flush with the curved bottom and connected to the curved bottom, each track being disposed on opposite sides of, and adjacent to the opening; and
    a door slideably received within the tracks, said door being of a size to encompass and occlude the opening in the bottom;
    wherein, when the door is opened, contents contained in the colander are pulled through the opening under the influence of gravity, and out of the colander without the need to rotate the container.

2. The colander of claim 1, wherein each track's cross section comprises two members having flat sides in cross section for contacting the door and providing a surface for the door to slide against.

3. The colander of claim 2, wherein each track's cross section comprises an L shaped subunit and an upper subunit.

4. The colander of claim 1, wherein the door is biased to completely occlude the opening.

5. The colander of claim 4, further comprising:
    a handle member connected to the door;
    a second handle member connected to a curved side wall of the colander; and
    a biasing element connected between the first and second handle member, for biasing the door away from the second handle member.

6. The colander of claim 1, further comprising:

a second door slideably received within the tracks, wherein said doors are arranged to slide apart to expose the opening.

7. The colander of claim 6, further comprising:

a biasing element connected between the two doors, thereby biasing the doors together to occlude the opening.

8. A colander for straining and/or holding food, said colander comprising:

a container with a curved sidewall having a plurality of orifices therethrough, and having a curved bottom;

an opening in the curved bottom;

a pair of curved tracks conformed and shaped to the curvature of the curved bottom and connected to the curved bottom, each track being disposed on opposite sides of, and adjacent to the opening; and a door slideably received within the tracks, said door being of a size to encompass and occlude the opening in the bottom;

wherein, when the door is opened, contents contained in the colander are pulled through the opening under the influence of gravity, and out of the colander without the need to rotate the container.

9. The colander of claim 8, wherein each track's cross section comprises two members having flat sides in cross section for contacting the door and providing a surface for the door to slide against.

10. The colander of claim 9, wherein each track's cross section comprises an L shaped subunit and an upper subunit.

11. The colander of claim 8, wherein the door is biased to completely occlude the opening.

12. The colander of claim 11, further comprising:

a handle member connected to the door;

a second handle member connected to a curved side wall of the colander; and a biasing element connected between the first and second handle member, for biasing the door away from the second handle member.

13. The colander of claim 8, further comprising:

a second door slideably received within the tracks, wherein said doors are arranged to slide apart to expose the opening.

14. The colander of claim 13, further comprising:

a biasing element connected between the two doors, thereby biasing the doors together to occlude the opening.

\* \* \* \* \*